United States Patent
Rice et al.

(10) Patent No.: US 6,418,727 B1
(45) Date of Patent: Jul. 16, 2002

(54) COMBUSTOR SEAL ASSEMBLY

(75) Inventors: Edward C. Rice, Indianapolis; Robert A. Ress, Jr., Carmel, both of IN (US)

(73) Assignee: Allison Advanced Development Company, Indianapolis, ID (US)

( * ) Notice: Subject to any disclaimer, the term of this patent is extended or adjusted under 35 U.S.C. 154(b) by 0 days.

(21) Appl. No.: 09/532,636

(22) Filed: Mar. 22, 2000

(51) Int. Cl.$^7$ ................................................. F02C 7/20
(52) U.S. Cl. ........................................................ 60/799
(58) Field of Search ............................ 60/799; 285/187

(56) References Cited

U.S. PATENT DOCUMENTS

| | | | |
|---|---|---|---|
| 3,463,498 A | 8/1969 | Bill | 277/138 |
| 3,657,882 A | 4/1972 | Hugoson | 60/39.31 |
| 3,670,497 A | 6/1972 | Sheldon | 60/39.32 |
| 4,103,905 A | 8/1978 | Desmond et al. | 277/56 |
| 4,907,743 A * | 3/1990 | Bouiller | 239/265.111 |
| 5,118,120 A | 6/1992 | Drerup et al. | 277/176 |
| 5,141,393 A | 8/1992 | Marra | 415/138 |
| 5,154,577 A | 10/1992 | Kellock et al. | 415/170.1 |
| 5,289,677 A | 3/1994 | Jarrell | 60/39.31 |
| 5,291,732 A | 3/1994 | Halila | 60/39.31 |
| 5,333,443 A | 8/1994 | Halila | 60/39.31 |
| 5,337,583 A * | 8/1994 | Giles | 60/752 |
| 5,400,586 A | 3/1995 | Bagepalli et al. | 60/39.32 |
| 5,709,530 A | 1/1998 | Cahill et al. | 415/170.1 |
| 6,065,756 A * | 5/2000 | Eignor | 277/545 |

FOREIGN PATENT DOCUMENTS

GB   2 035 474 A   6/1980   ............ F16J/15/08

* cited by examiner

*Primary Examiner*—Ehud Gartenberg
(74) *Attorney, Agent, or Firm*—Woodward, Emhardt, Naughton, Moriarty & McNett (57) ABSTRACT

The present invention contemplate a seal assembly for reducing the passage of fluid between a combustor liner and a turbine vane segment in a gas turbine engine. In one embodiment, the turbine vane segment has a lip portion defining a sealing surface. A seal element having first and second seal portion is coupled to the turbine vane segment by a support element. The support element urges the first seal portion into engagement with an aft edge of the combustor liner and positions the second seal portion adjacent the sealing surface of the turbine vane segment, while allowing relative movement between the second seal portion and the sealing surface in a direction substantially parallel to the sealing surface.

24 Claims, 6 Drawing Sheets

COMBUSTOR SEAL ASSEMBLY

This invention was made with U.S. Government support under contract 200-1X-14B42103 awarded by the United States Air Force, and the U.S. government may have certain rights in the invention.

BACKGROUND OF THE INVENTION

The present invention relates generally to a combustor seal within a gas turbine engine. More particularly, one embodiment of the present invention defines a seal assembly for disposition across a space between the combustor liner and the first stage turbine vane to reduce the passage of gas therethrough. Although the present invention was developed for use in a gas turbine engine, certain applications of the invention may fall outside of this field.

A gas turbine engine is typical of the type of turbo machinery in which the present invention described herein may be advantageously employed. It is well known that a gas turbine engine conventionally comprises a compressor for compressing inlet air to an increased pressure. A mixture of fuel and the increased pressure air is burned in the combustor to generate a high temperature gaseous flow stream which is discharged from the combustor and is directed by a series of turbine vanes to a series of turbine blades. The turbine blades convert the thermal energy from the high temperature gaseous flow stream into rotational kinetic energy, which in turn drives the compressor and a propeller, fan or other similar device. Alternatively, the high temperature gaseous flow stream may be used directly as a thrust for providing motive force, such as in a turbine jet engine.

In a typical gas turbine engine, there exists a pressure drop across the liner such that the pressure inside the liner is lower than the higher pressure compressor discharge cooling gas flowing across the outside of the combustor liner. A seal is sometimes provided in the area between the combustor and turbine sections to prevent the uncontrollable passage of high pressure cooling gas into the flow path of the low pressure combustor gases.

Heretofore, there has been a need for an improved seal assembly for disposition across a space between the combustor and turbine sections in a gas turbine engine. The present invention satisfies this need in a novel and unobvious way.

SUMMARY OF THE INVENTION

One form of the present invention contemplates a seal for reducing the passage of fluid between two adjacent members in a gas turbine engine.

Another form of the present invention contemplates an apparatus, comprising: a gas turbine engine including adjacent members with one of the members defining a sealing surface, a seal element having first and second seal portions and coupled to one of the adjacent members by a support element. The support element urges the first seal portion into engagement with the other adjacent member and positions the second seal portion adjacent the sealing surface, while allowing relative movement between the second seal portion and the sealing surface in a direction substantially parallel to the sealing surface.

Yet another form of the present invention contemplates a seal assembly in a gas turbine engine, comprising: a combustor liner and a turbine vane segment having a sealing surface, a seal member having first and second seal portions and being coupled to the turbine vane segment by a number of positioning members that urge the first seal portion against the combustor liner and position the second seal portion adjacent the sealing surface. The positioning members allow relative movement between the seal member and the turbine vane segment in a direction substantially parallel to the sealing surface.

A further form of the present invention contemplates a combination, comprising: a gas turbine engine including a combustor liner having an aft edge and a turbine vane segment having a lip portion extending toward the aft edge and defining a sealing surface, a plurality of seal elements interconnected to form an integral seal member having substantially uninterrupted first and second sealing portions, a plurality of spring members each coupled to a corresponding seal element and to a portion of the turbine vane segment to engage the first sealing portion in an abutting relationship with the aft edge of the combustor liner and to position the second sealing portion in a close proximal relationship with the sealing surface of the turbine vane segment. The spring members maintain the abutting and close proximal relationships during relative movement between the combustor liner and the turbine vane segment.

One object of the present invention is to provide a seal for reducing the passage of fluid between a combustor liner and a turbine vane segment in a gas turbine engine.

Related objects and advantages of the present invention will be apparent from the following description.

DESCRIPTION OF THE PREFERRED EMBODIMENTS

For the purposes of promoting an understanding of the principals of the invention, reference will now be made to the embodiment illustrated in the drawings and specific language will be used to describe the same. It will nevertheless be understood that no limitation of the scope of the invention is hereby intended, and any alterations and further modifications of the illustrated device, and any further applications of the principals of the invention as illustrated herein being contemplated as would normally occur to one skilled in the art to which the invention relates.

Figure 1:
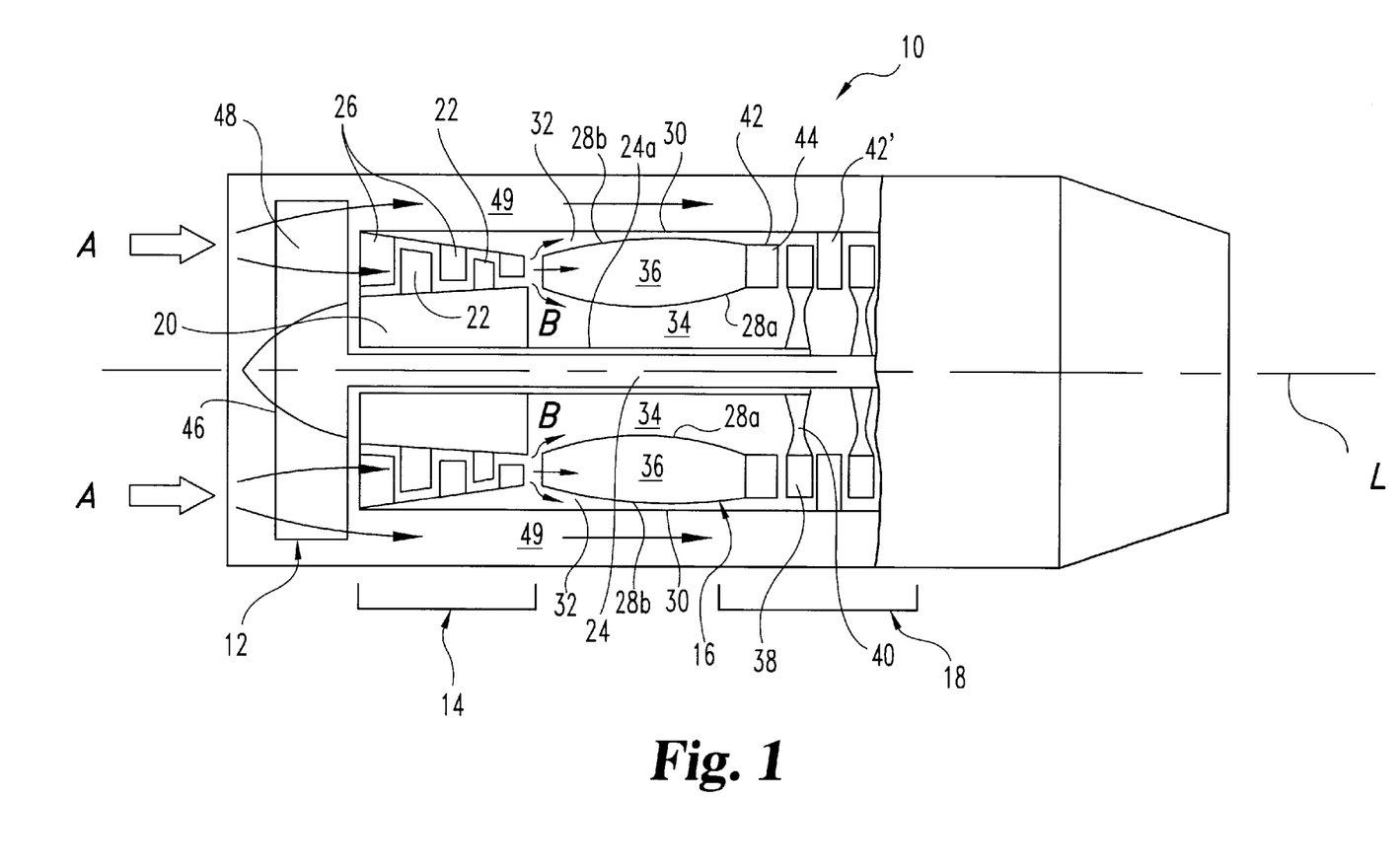
FIG. 1 is a schematic representation of a gas turbine engine.

With reference to FIG. 1, there is illustrated a schematic representation of a gas turbine engine 10. Gas turbine engine 10 includes a longitudinal axis L extending generally along the high temperature gaseous flow stream and has a generally annular configuration; however, other configurations are also contemplated as would occur to one of ordinary skill in the art. Gas turbine engine 10 includes a fan section 12, a compressor section 14, a combustor section 16, and a turbine section 18 that are integrated to produce an aircraft flight propulsion engine. This particular type of gas turbine engine is generally referred to as a turbo-fan. An alternate form of a gas turbine engine includes a compressor, a combustor, and a turbine integrated to produce an aircraft flight propulsion engine without a fan section. It should be understood that the term aircraft is generic, and includes helicopters, airplanes, missiles, unmanned space devices and other substantially similar devices. It is also important to realize that there are a multitude of ways in which gas turbine engine components can be linked together to produce a flight propulsion engine. For instance, additional compressor and turbine stages could be added with intercoolers connected between the compressor stages. Moreover, reheat combustion chambers could be added between the turbine stages.

The present invention described herein is applicable to all types of gas turbine engines and is not intended to be limited herein to the gas turbine engine schematic represented in FIG. 1. For example, a gas turbine engine is equally suited to be used in industrial applications, such as pumping sets for gas and oil transmission lines, electricity generation, and naval propulsion.

The compressor section 14 includes a rotor 20 having a plurality of compressor blades 22 coupled thereto. The rotor 20 is affixed to a shaft 24a that is rotatable within the gas turbine engine 10. A plurality of compressor vanes 26 are positioned adjacent the compressor blades 22 to direct the flow of air through compressor section 14. Combustor section 16 includes an inner combustor liner 28a and an outer combustor liner 28b which define an annular combustion chamber 36. The inner and outer combustor liners 28a, 28b are spaced apart from a housing 30 and define cooling fluid passages 32 and 34. Fuel is introduced into combustion chamber 36 via a number of fuel nozzles (not shown) and is ignited and burned to generate a hot gaseous fluid stream which provides the energy necessary to power gas turbine engine 10. Turbine section 18 includes a plurality of turbine blades 38 coupled to a rotor disk 40, which in turn is affixed to the shaft 24. A plurality of turbine vanes 42 and 42' are positioned adjacent the turbine blades 38 to direct the flow of the hot gaseous fluid stream through turbine section 18. A turbine nozzle 44 is defined by the plurality of turbine vanes 42 positioned after the combustor section 16 to direct the hot gaseous fluid stream exiting the combustion chamber 36. In the preferred embodiment, the gaseous fluid is air.

In operation, the turbine section 18 provides rotational power to shaft 24 which in turn drives the fan section 12 and shaft 24a which in turn drives the compressor section 14. The fan section 12 includes a fan 46 having a plurality of fan blades 48. Air enters the gas turbine engine 10 in the direction of arrows A, passes through the fan section 12, and is fed into the compressor section 14 and a bypass duct 49. The compressed air exiting compressor section 14 is routed into combustion chamber 36 and cooling air passages 32, 34 in the direction of arrows B. During normal operation of gas turbine engine 10, the cooling air flowing through passages 32, 34 is at a higher pressure than the hot gaseous air stream flowing through combustion chamber 36.

Figure 2:
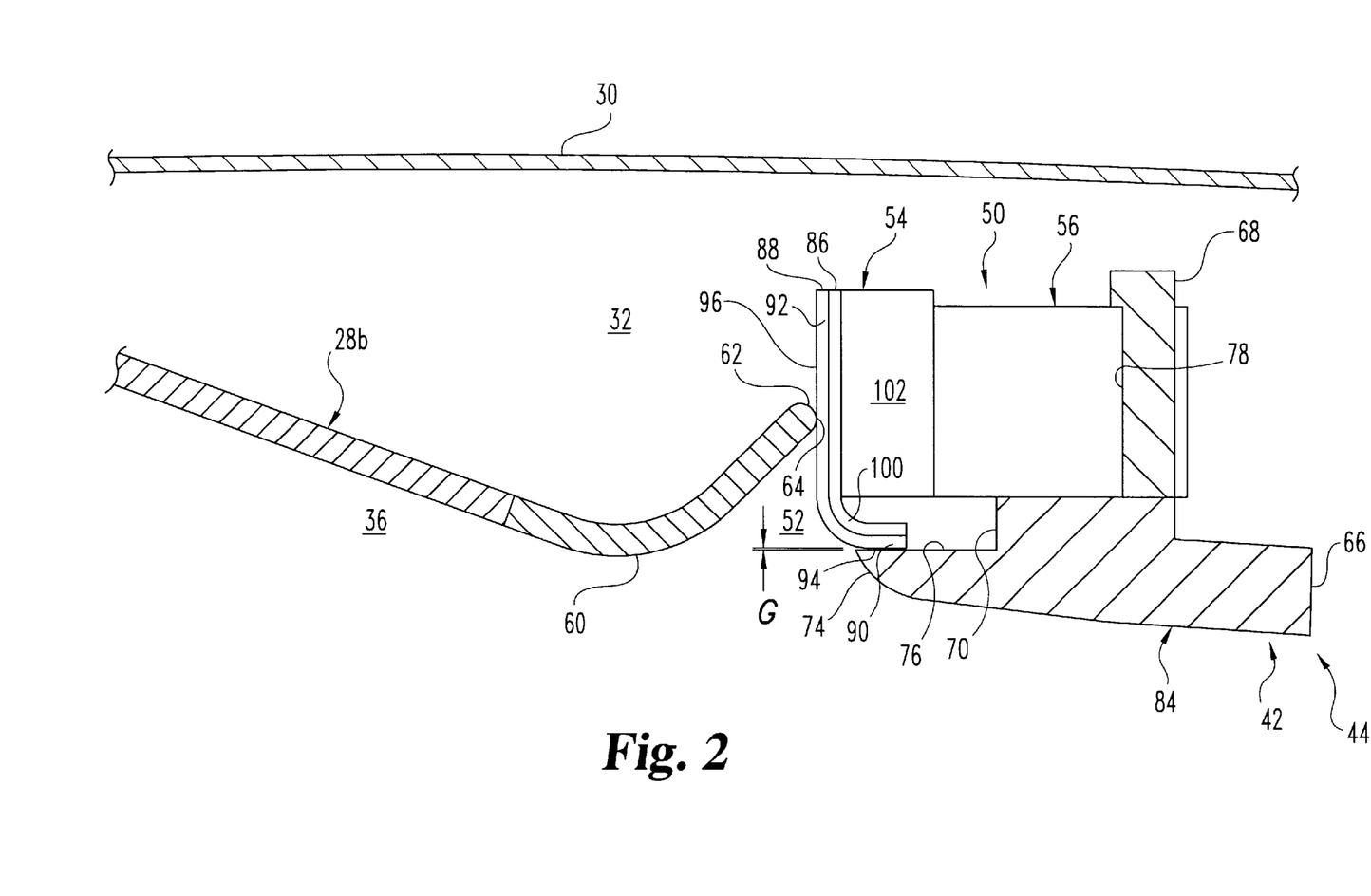
FIG. 2 is a sectional view of a portion of a gas turbine engine at the interface between the combustor and turbine sections, illustrating one embodiment of a combustor aft seal assembly.

Referring now to FIG. 2, a sealing device 50 is positioned adjacent a passageway 52 formed between the outer combustor liner 28b and the turbine nozzle 44 to seal off air flow between cooling air passage 32 and combustion chamber 36. It should be understood that the terms "seal" and "sealing" used herein are intended to have a broad meaning that includes a reduction in the passage of air, and do not necessarily require a one-hundred percent reduction in fluid flow, unless specifically provided to the contrary. The aft end portion of outer combustor liner 28b includes an outwardly extending curved lip 60. The aft end 62 of combustor liner lip 60 defines an annular surface 64. One function of lip 60 is to aid in resisting mechanical buckling which otherwise might occur in response to the pressure differential between cooling air passage 32 and combustion chamber 36. A plurality of cooling apertures (not shown) may be added at various locations along lip 60 to allow cooling air to flow onto the interior surface of lip 60. The plurality of cooling apertures enables the lip 60 to operate in an increased temperature environment. Each of the turbine vane segments 42, which form the nozzle 44, includes a base portion 66 and a flange portion 68. Base portion 66 includes a shoulder 70 and an axial lip 74 extending toward combustor liner lip 60 and defining a circumferential sealing surface 76. Flange 68 extends radially from base portion 66 and defines an annular groove 78 extending from shoulder 70 towards the opposite end of flange 68.

Figure 3:
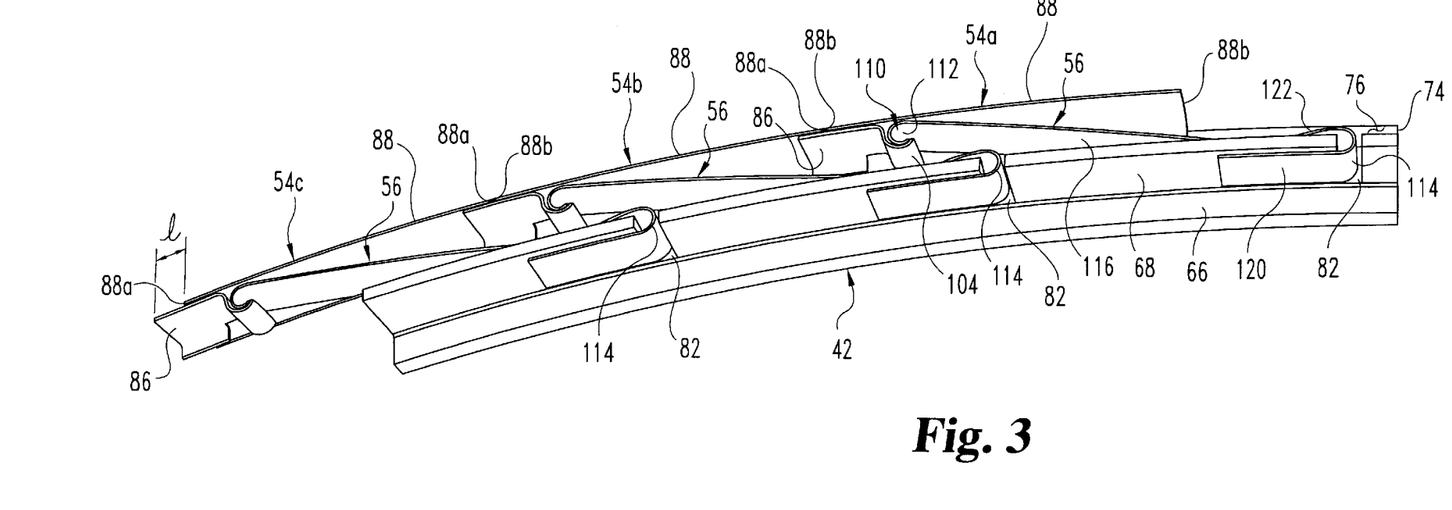
FIG. 3 is a rear perspective view of a segment comprising a portion of the combustor aft seal assembly of FIG. 2.
Figure 4:
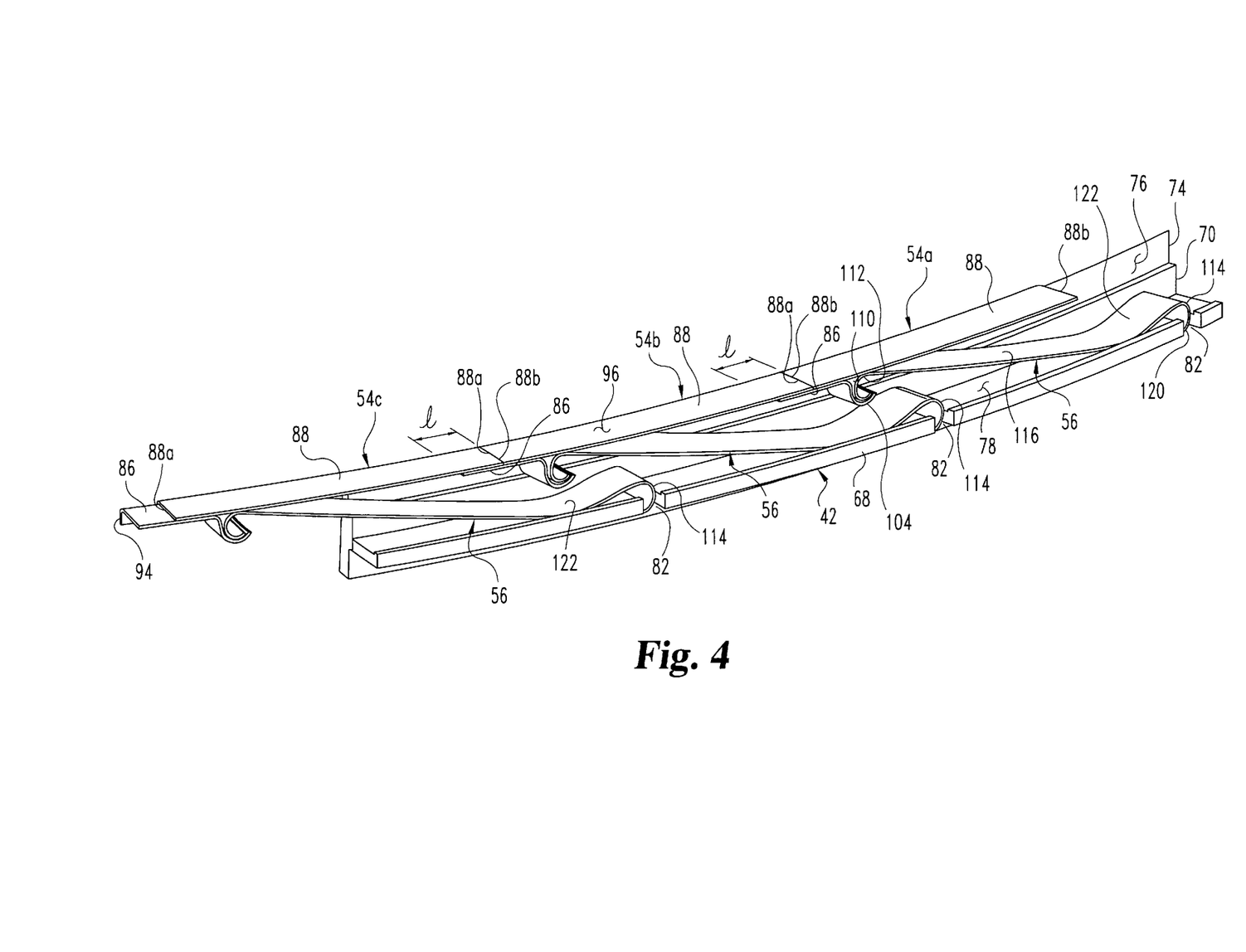
FIG. 4 is a top perspective view of a segment comprising a portion of the combustor aft seal assembly of FIG. 2.

Referring to FIGS. 3 and 4, there is illustrated one turbine vane segment 42 of the turbine nozzle 44. In one embodiment of the present invention, turbine nozzle 44 includes thirteen vane segments 42, which are coupled together by any method known to one of ordinary skill in the art to define a continuous, annular turbine nozzle 44. Flange 68 of turbine vane segment 42 is circumferentially interrupted by a number of radial slots 82, preferably uniformly positioned about turbine nozzle 44. Each vane segment 42 preferably includes three radial slots 82. In one embodiment of the present invention, three sealing elements 54a, 54b, 54c are each operatively coupled to vane segment 42 by a biasing member 56. More specifically, one end portion of each biasing member 56 is received within a corresponding radial slot 82 and radial groove 78 to clamp biasing member 56 to turbine vane segment 42, and another end portion of biasing member 56 is pivotally coupled to a corresponding sealing element 54a, 54b, 54c. Further details regarding the assembly and installation of sealing device 50 will be described more fully below.

Figure 5:
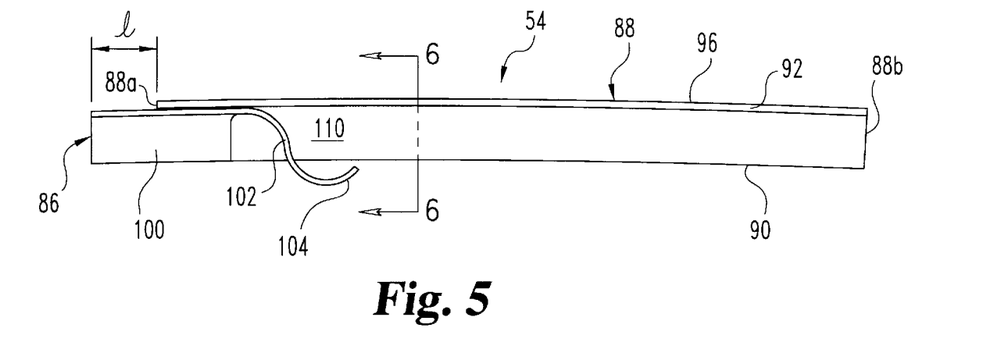
FIG. 5 is a top plan view of a sealing element, comprising a portion of the combustor aft seal assembly of FIG. 2.
Figure 6:
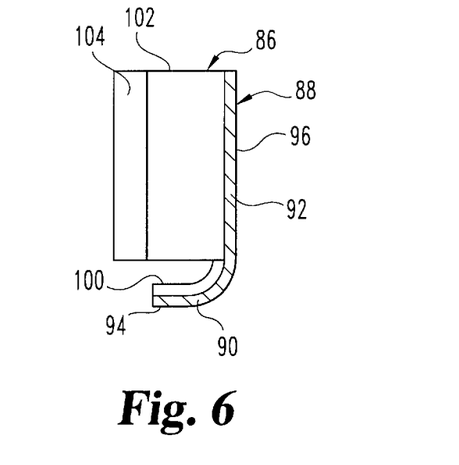
FIG. 6 is a sectional view of the sealing element illustrated in FIG. 5, taken along line 6—6 of FIG. 5 and rotated ninety degrees clockwise.

Referring now to FIGS. 5 and 6, there are illustrated various details of a sealing element 54. Sealing element 54 includes an inner plate 86 and an outer plate 88. Outer plate 88 includes a base portion 90 defining a sealing surface 94, and a flange portion 92 extending perpendicularly from base portion 90 and defining a sealing surface 96. Inner plate 86 includes a plate portion 100 and a retaining portion 102. Plate portion 100 is configured similar to outer plate 88 and is attached to outer plate 88 in an overlapping relationship, with a length "l" extending beyond end 88a of outer plate 88. Retaining portion 102 extends from plate portion 100 toward end 88b of outer plate 88 and includes a partially cylindrical end portion 104. End portion 104 and flange portion 92 of outer plate 88 define a passage 110. In one form inner and outer plates 86, 88 are formed of high temperature, oxidation resistant materials such as nickel and cobalt based alloys.

Figure 7:
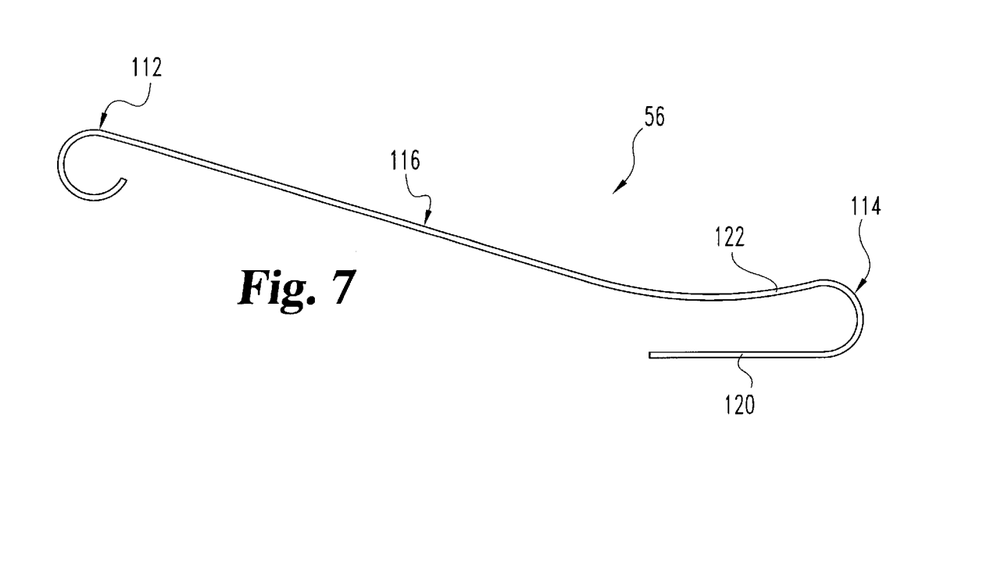
FIG. 7 is a side view of a biasing member, comprising a portion of the combustor aft seal assembly of FIG. 2.

Referring now to FIG. 7, there is illustrated various details of one embodiment of the biasing member 56. In one embodiment, biasing member 56 is a spring having a leaf-type configuration. However, other types of spring configurations are also contemplated as would occur to one of ordinary skill in the art. Spring 56 includes a first end portion 112 joined to a second end portion 114 by a connecting portion 116. First end portion 112 is partially cylindrical and is sized to be received within passage 110 of sealing element 54. Second end portion 114 is generally U-shaped and includes a first leg 120 and an opposite second leg 122. Connecting portion 116 is generally flat and is angularly disposed between first and second end portion 112, 114. Although spring 56 is preferably a unitary structure, it is also contemplated that spring 56 could alternatively be assembled from multiple pieces connected together by any method known to one of ordinary skill in the art. Spring 56 is formed of a material capable of withstanding high temperature environments without a substantial change in strength, flexibility, or shape; materials such as, but not limited to nickel and cobalt based alloys, are contemplated herein.

Referring once again to FIGS. 3–4, one method of assembling and installing sealing device 50 within gas turbine engine 10 will now be described in further detail. However, it should be understood that other methods are also contemplated as would occur to one of ordinary skill in the art. Springs 56 are attached to vane segment 42 by initially splaying apart clamping portion 114 and sliding the base of clamping portion 114 through radial slot 82 until the first and second legs 120, 122 are positioned on opposite sides of flange portion 68. Spring 56 is then released, allowing first and second legs 120, 122 to snap back toward their original, unsplayed positions, with a portion of second leg 122 positioned within radial groove 78 (FIG. 4). With flange portion 68 firmly clamped between first and second legs 120, 122 and a portion of second leg 122 positioned within groove 78, the radial, axial, and rotational positions of springs 56 are securely maintained relative to vane segment 42.

Once springs 56 are clamped to vane segment 42, each of sealing elements 54a, 54b, 54c are sequentially attached to a corresponding spring 56. First end portion 112 of spring 56 is initially biased away from flange portion 68 until first end portion 112 is positioned axially beyond lip 74 of vane segment 42. First end portion 112 is then slidably received within passage 110 of sealing element 54a, thus providing a pivotal connection between sealing element 54a and spring 56. As the biasing force exerted on spring 56 is released, spring 56 will return toward its unbiased configuration and sealing element 54a will be positioned adjacent vane segment 42, with circumferential sealing surface 94 of outer plate 88 facing opposite and in close proximity to surface 76 of lip 74 (FIG. 2). Sealing elements 54b, 54c are then sequentially installed on vane segment 42 using the same installation procedure described above, with ends 88a and 88b of adjacent sealing elements being placed in close proximity, and preferably in an abutting relationship. As shown in FIG. 4, outer plate 88 overlaps length "l" of an adjacent inner plate 86. This overlapping feature not only aids in the alignment of adjacent outer plates 88, but also serves to seal any gaps or voids which might exist at the interface between ends 88a and 88b of adjacent outer plates 88. The remaining sealing elements 54, with the exception of the final sealing element, are sequentially attached to the other vane segments which comprise the turbine nozzle 44 in the same manner as outlined above.

Figure 8:
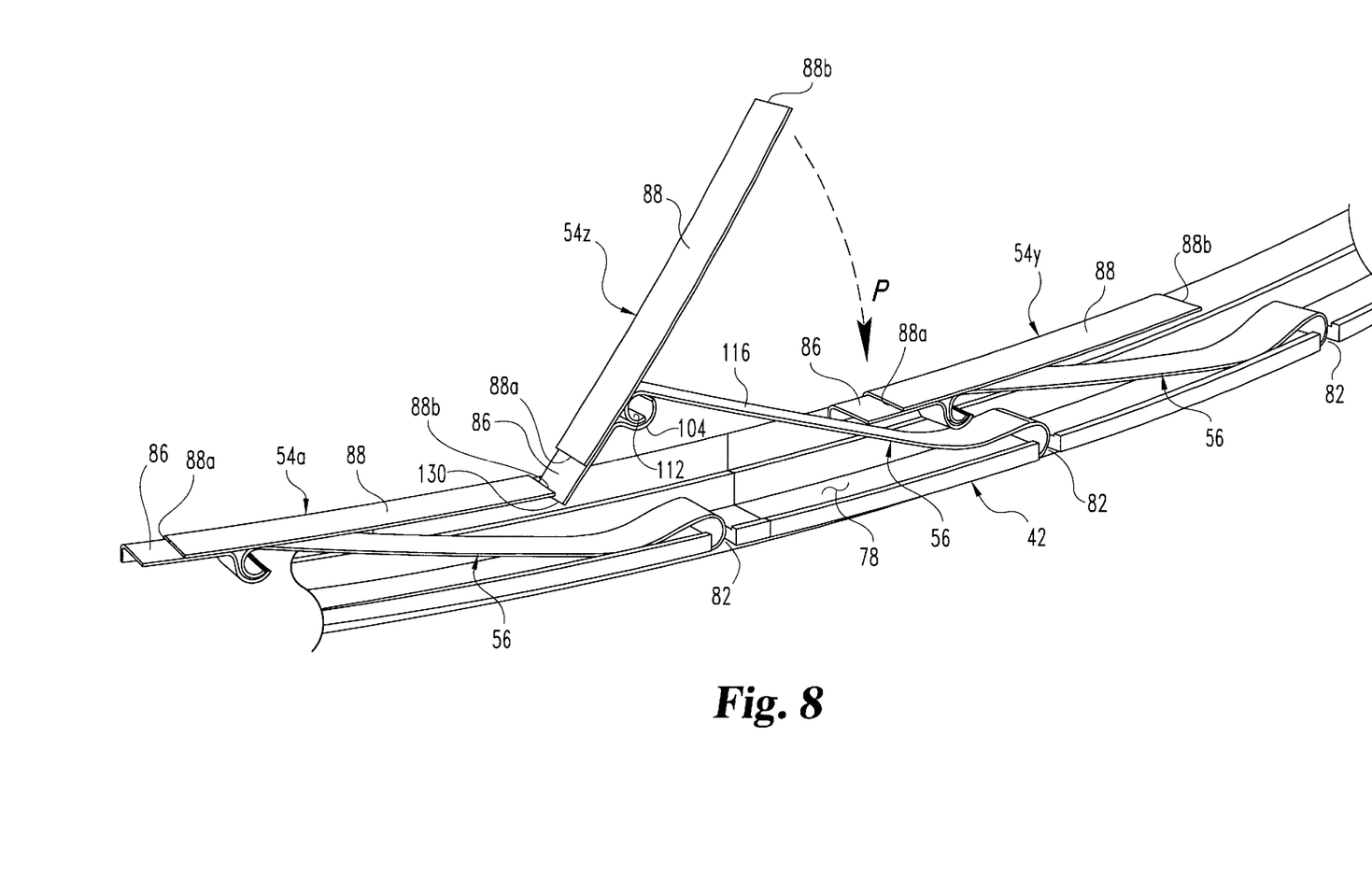
FIG. 8 is a top perspective view of a segment of the combustor aft seal assembly of FIG. 2, illustrating the installation of the final sealing element.

Referring now to FIG. 8, there is illustrated the final sealing element 54z being installed between adjacent sealing elements 54a and 54y by initially following the installation procedure outlined above. However, in order to allow final sealing element 54z to properly interface with adjacent sealing elements 54a and 54y, the outer edge 130 of inner plate 86 must initially be positioned beneath end 88b of outer plate 88 of sealing element 54a. Then, while the biasing force exerted on spring 56 is slowly released, end 88b of final sealing element 54z is simultaneously pivoted in the direction of arrow P, thus allowing inner plate 86 to slide under outer plate 88 of sealing element 54a. When the biasing force is completely released, ends 88a, 88b of sealing element 54z will abut ends 88b, 88a of adjacent sealing elements 54a, 54y, respectively. At this point, all of the sealing elements 54 will be attached to the vane segments 42 comprising the turbine nozzle 44 and will be adjoined in an interlocking arrangement, thus defining a substantially continuous, circumferential sealing surface 94 and a substantially continuous, annular sealing surface 96 (FIG. 2).

Referring once again to FIG. 2, the combustor liner 28b is preferably first installed in the housing 30. The turbine nozzle assembly with sealing device 50 is axially displaced until annular surface 64 of combustor liner lip 60 abuts annular sealing surface 96 of sealing elements 54. Sealing elements 54 are thereby pressure-loaded against lip 60 via the axial force exerted by springs 56. In one embodiment of the present invention, the upstream end portions of combustor liners 28a, 28b are fixed to gas turbine engine 10, while the downstream end portions remain unrestrained. In this preferred embodiment, the downstream end portions undergo considerable axial and radial displacement relative to other structures of gas turbine engine 10, including turbine nozzle 44, due to material temperature differences between adjacent gas turbine components. These temperature differences and associated material expansions and contractions may be present at any time during the starting, stopping, or steady operation of gas turbine engine 10.

In operation, sealing elements 54 are positioned across passageway 52 via springs 56 to prevent the uncontrollable passage of air from cooling air passages 32 and 34 to combustion chamber 36 during the operation of gas turbine engine 10. More specifically, annular sealing surface 96 of sealing elements 54 is pressure loaded against annular surface 64 of combustor liner lip 60 in an abutting relationship to provide a positive seal therebetween. Additionally, circumferential sealing surface 94 of sealing elements 54 is positioned generally parallel to the circumferential surface 76 formed on the vane segments 42 defining the nozzle 44 to form a proximate spatial relationship therebetween. Springs 56 inhibit the radial movement of sealing elements 54 relative to turbine nozzle 44 to maintain the constant distance between circumferential surfaces 76 and 94.

Because sealing elements 54 are pressure loaded against combustor liner lip 60, as combustor liners 28a, 28b axially expand and contract, sealing elements 54 will correspondingly be displaced in an axial direction, thus maintaining the abutting relationship between annular surfaces 64 and 96. Likewise, as combustor liners 28a, 28b radially expand and contract, the annular surface 64 of combustor liner lip 60 will frictionally slide along the annular sealing surface 96 of sealing elements 54, also maintaining the abutting relationship therebetween. Even during such relative movement, springs 56 will continue to maintain the constant, spatial relationship between circumferential surfaces 76 and 94. It should thus be apparent that one function of springs 56 is to permit relative movement of sealing elements 54 in a direction that is substantially parallel to circumferential surface 76 of vane segment 42, while maintaining the sealing relationships between circumferential surfaces 76, 94 and annular surfaces 64, 96.

In one embodiment of the invention, an annular gap G exists between adjacent circumferential surfaces 76 and 94.

One function of gap G is to allow a predetermined amount of cooling air to flow across circumferential surfaces 76 and 94. Another function of gap G is to allow the fluid flow to continuously purge the cavity between sealing element 54 and turbine vane segment 42 to avoid the stagnant build up of hot gases, thus having the effect of providing cooling to springs 56 and the back side of sealing elements 54. The continuous flow of cooling air across the above-mentioned structures tends to minimize thermal stresses which otherwise might develop, and consequently reduces the possibility of thermal deformation. In another embodiment of the invention, gap G is eliminated and circumferential surfaces 76 and 94 are placed in direct abutment. In this instance, a frictional sliding interface exists between circumferential surfaces 76 and 94 during movement of sealing element 54 relative to turbine nozzle 44. A number of cooling apertures (not shown) may be defined in sealing element 54 at various locations to allow cooling air to flow across the exposed, outer sealing surfaces 94, 96 so as to provide cooling to outer plate 88.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. An apparatus, comprising:
   a gas turbine engine including a combustor liner and a turbine vane segment spaced apart to define a passageway therebetween, one of said combustor liner and said turbine vane having a sealing surface;
   a seal element having a first seal portion and a second seal portion; and
   a support element coupled to said seal element and to said one of said combustor liner and said turbine vane segment, said support element urging said first seal portion into engagement with the other of said combustor liner and said turbine vane and positioning said second seal portion adjacent said sealing surface, said support element allowing relative movement between said second seal portion and said sealing surface in a direction substantially parallel to said sealing surface.

2. The apparatus of claim 1, wherein said first seal portion is arranged substantially perpendicular to said second seal portion.

3. The apparatus of claim 1, wherein said support element inhibits relative movement of said second seal portion and said sealing surface in directions not substantially parallel to said sealing surface.

4. The apparatus of claim 1, wherein said combustor liner is an outer combustor liner and includes an outwardly extending arcuate-shaped lip defining an aft edge, a portion of said aft edge engaging said first seal portion of said seal element.

5. The apparatus of claim 4, wherein said aft edge is rounded.

6. The apparatus of claim 1, wherein said turbine vane segment includes a flange portion aligned substantially perpendicular to said sealing surface, said support element having a generally U-shaped end portion for receiving said flange portion and clamping said support element thereto.

7. The apparatus of claim 6, wherein said flange portion defines a groove sized to receive a portion of said U-shaped end portion therein to inhibit relative movement between said support element and said turbine vane segment in directions not substantially parallel to said sealing surface.

8. The apparatus of claim 1, wherein said support element is pivotally connected to said seal element.

9. The apparatus of claim 8, wherein said seal element has a retaining portion defining a cavity sized to receive an at least partially rounded end portion of said support element therein to allow pivotal movement between said seal element and said support element.

10. The apparatus of claim 1, wherein said second seal portion of said seal element frictionally engages said sealing surface during said relative movement.

11. A seal assembly in a gas turbine engine, comprising:
    a combustor liner and a turbine vane segment spaced apart to define a passageway therebetween, said turbine vane segment defining a sealing surface;
    a seal member having a first seal portion and a second seal portion, said seal member being positionable across said passageway; and
    a plurality of positioning members, each coupled to said turbine vane segment and to said seal member, said positioning members urging said first seal portion against a portion of said combustor liner and positioning said second seal portion adjacent said sealing surface, said positioning members allowing movement of said seal member relative to said turbine vane segment in a direction substantially parallel to said sealing surface.

12. The assembly of claim 11, wherein said positioning members inhibit movement of said seal member relative to said turbine vane segment in directions not substantially parallel to said sealing surface.

13. The assembly of claim 11, wherein said seal member comprises a plurality of individual seal elements interfacing to form substantially continuous first and second seal portions, each of said seal elements being coupled to said turbine vane segment by a corresponding one of said positioning members.

14. The assembly of claim 13, wherein each of said seal elements includes an inner plate and an outer plate, said inner plate being operatively attached to said outer plate with a portion of said inner plate extending beyond an end of said outer plate, each of said outer plates overlapping said portion of said inner plate of an adjacent seal element.

15. The assembly of claim 13, wherein each of said seal elements include a coupling portion sized to receive a substantially complementary end portion of said corresponding one of said positioning members to allow pivotal movement therebetween.

16. The assembly of claim 11, wherein said seal member separates a high pressure cooling air supply from a low pressure hot gaseous air stream, said second seal portion of said seal member being spaced from said sealing surface to allow a predetermined amount of said cooling air to pass therebetween.

17. The assembly of claim 11, wherein said combustor liner includes an outwardly extending curved lip defining an aft edge, a portion of said aft edge engaging said first seal portion of said seal member.

18. The assembly of claim 11, wherein said turbine vane segment includes an axial lip portion extending towards said combustor liner and defining said sealing surface, said sealing surface being a circumferential sealing surface.

19. The assembly of claim 18, wherein said first seal portion of said seal member defines an annular sealing surface, and wherein said second seal portion defines a second circumferential sealing surface substantially complementary to said circumferential sealing surface of said axial lip.

20. The assembly of claim 18, wherein said turbine vane segment includes a plurality of radial flange portions uniformly positioned about a periphery of said turbine vane segment, each of said positioning members having a generally U-shaped end portion for receiving and clamping onto a corresponding one of said radial flange portions.

21. The assembly of claim 20, wherein each of said radial flange portions includes a radial groove sized to receive a portion of said U-shaped end portion therein to inhibit radial and angular movement of said positioning members relative to said turbine vane segment.

22. A combination, comprising:

a gas turbine engine including a combustor liner and a turbine vane segment, said combustor liner having an aft edge, said turbine vane segment having a lip portion extending toward said aft edge and defining a sealing surface;

a plurality of seal elements interconnected to form an integral seal member, said seal member having a substantially uninterrupted first sealing portion and a substantially uninterrupted second sealing portion;

a plurality of spring members, each of said spring members coupled to a corresponding one of said seal elements and to a portion of said turbine vane segment, said spring members engaging said first sealing portion in an abutting relationship with said aft edge and positioning said second sealing portion in a close proximal relationship with said sealing surface; and wherein said spring members maintain said abutting and close proximal relationships during relative movement between said combustor liner and said turbine vane segment.

23. The combination of claim 22, wherein said plurality of spring members allow relative movement between said second sealing portion and said sealing surface in a direction substantially parallel to said sealing surface and inhibiting said relative movement in directions not substantially parallel to said sealing surface.

24. An apparatus, comprising:

a gas turbine engine including a combustor liner and a turbine vane segment spaced apart to define a passageway therebetween, one of said combustor liner and said turbine vane segment having a sealing surface;

a seal having a first sealing portion and a non-parallel second sealing portion; and means for positioning said seal across said passageway and biasing said first sealing portion against the other of said combustor liner and said turbine vane segment while maintaining a substantially constant distance between said second sealing portion and said sealing surface.

* * * * *